Patented Sept. 6, 1932

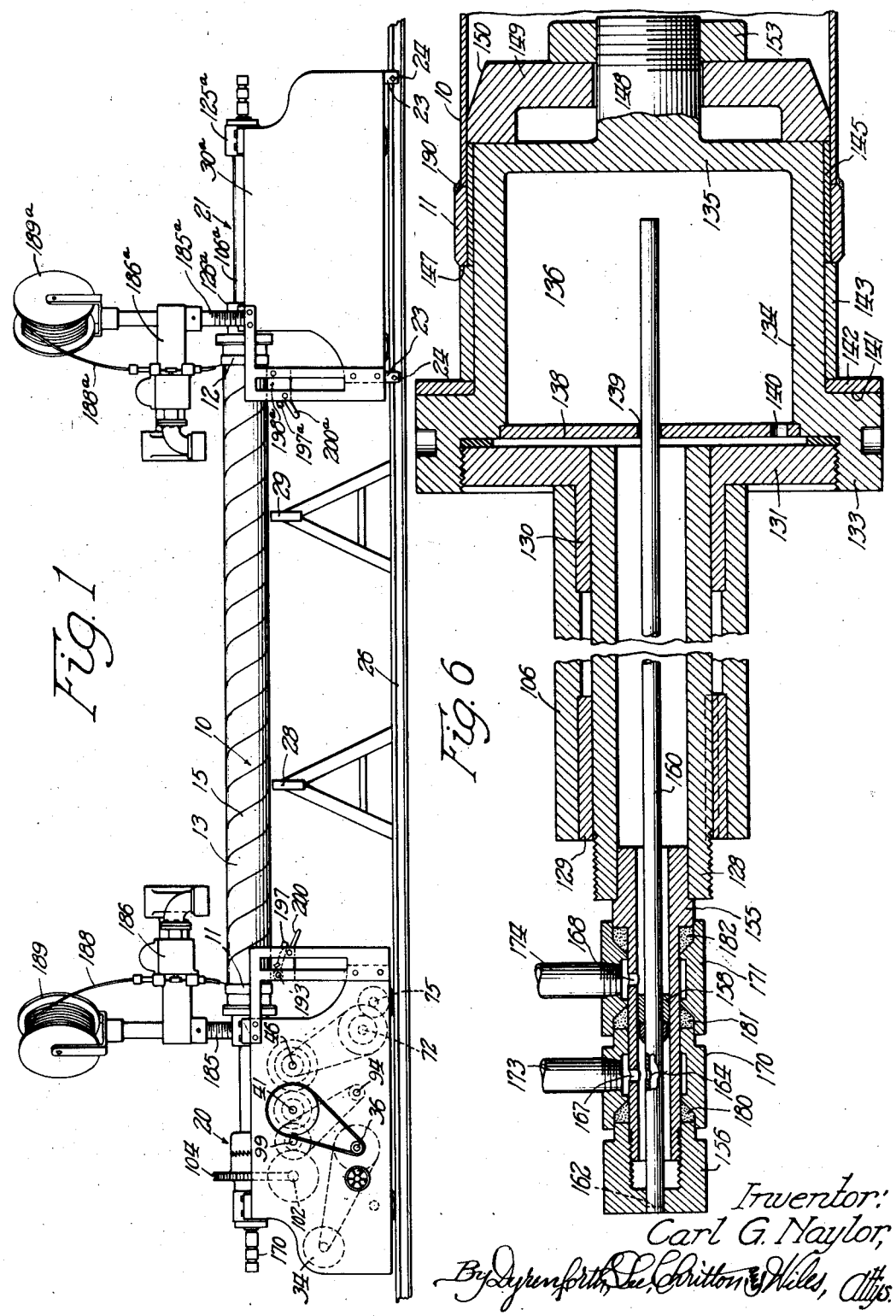

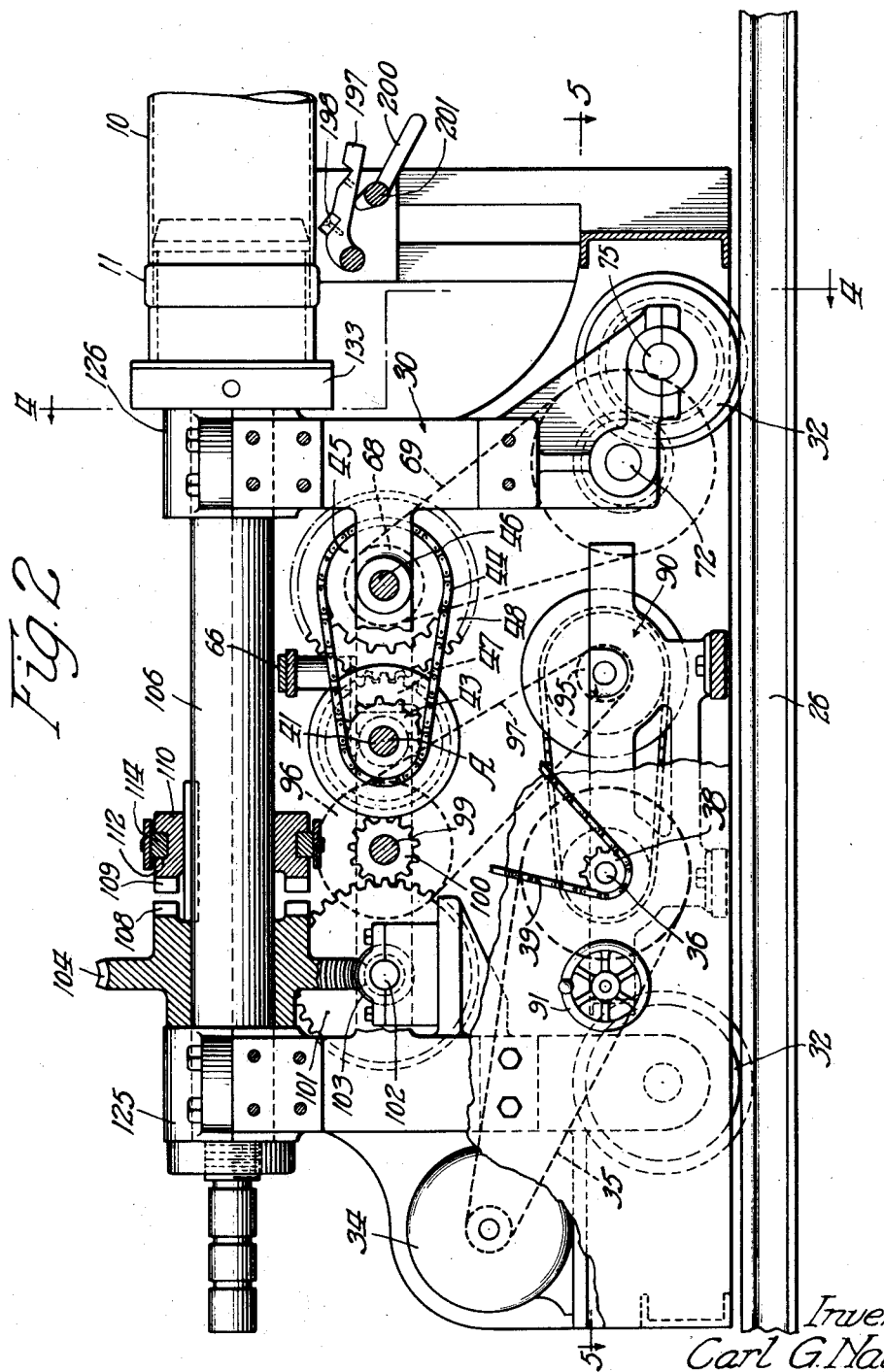

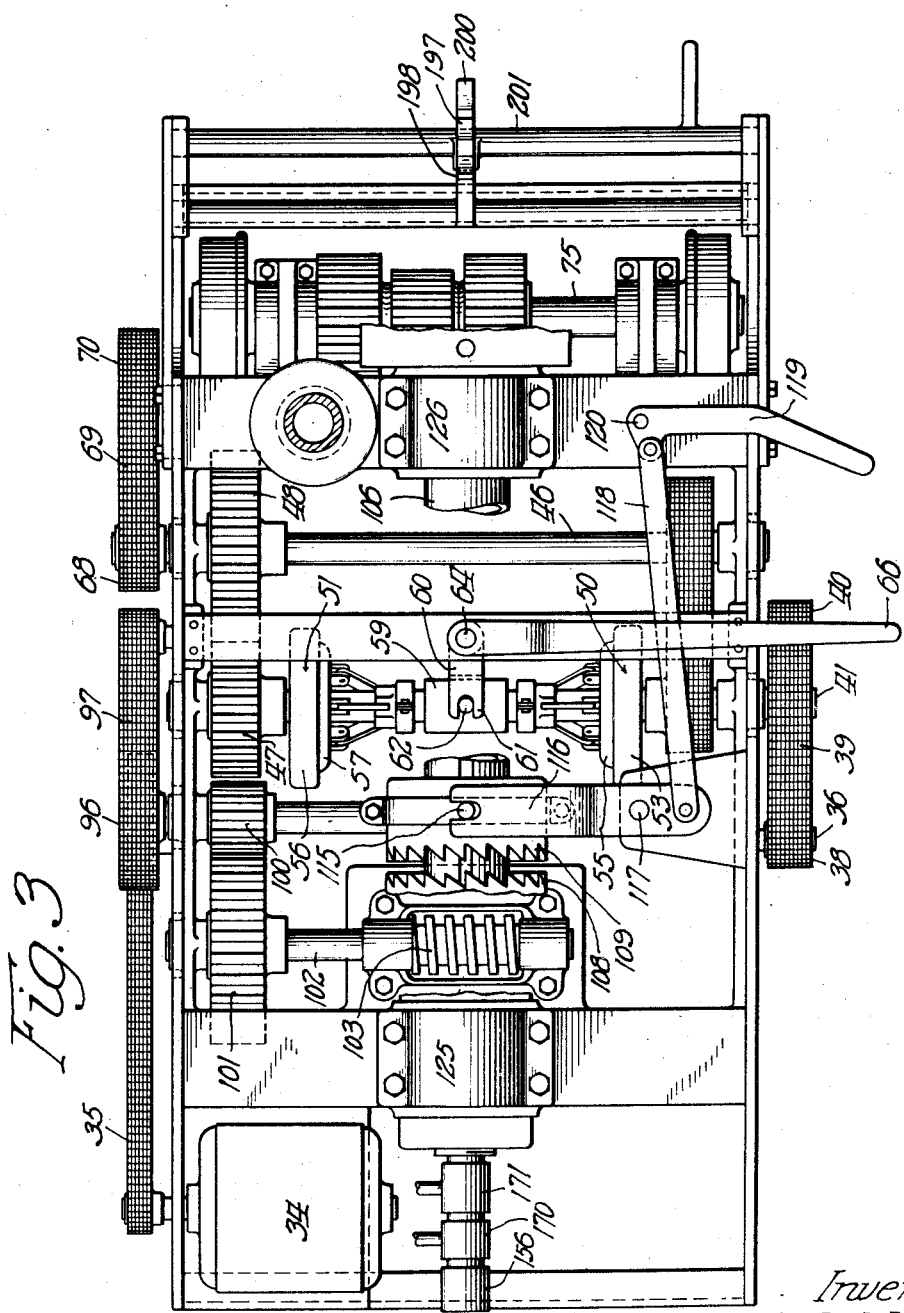

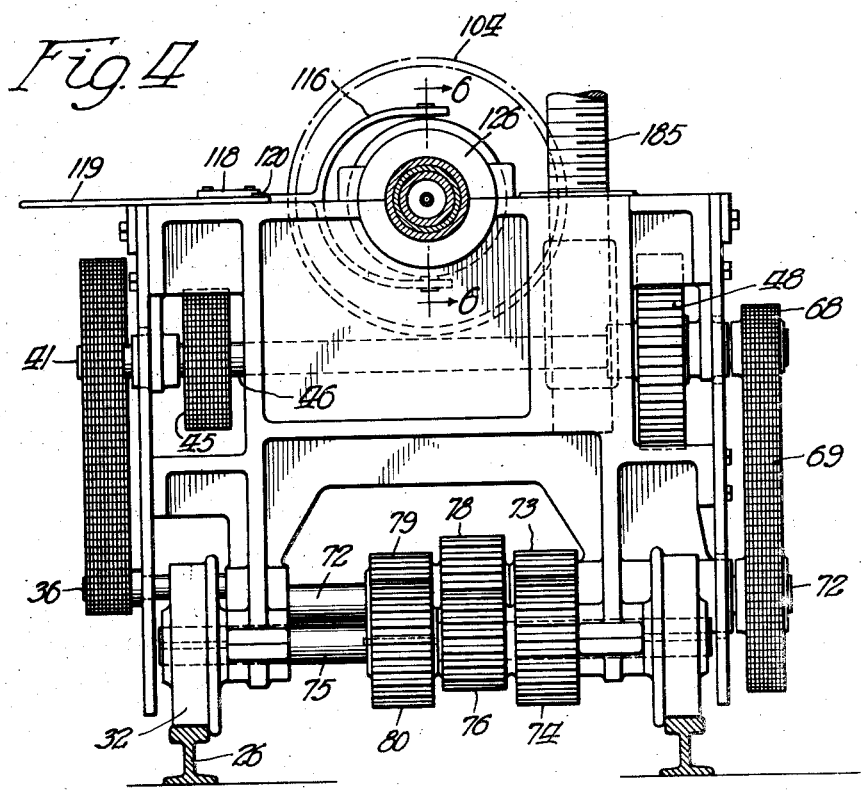

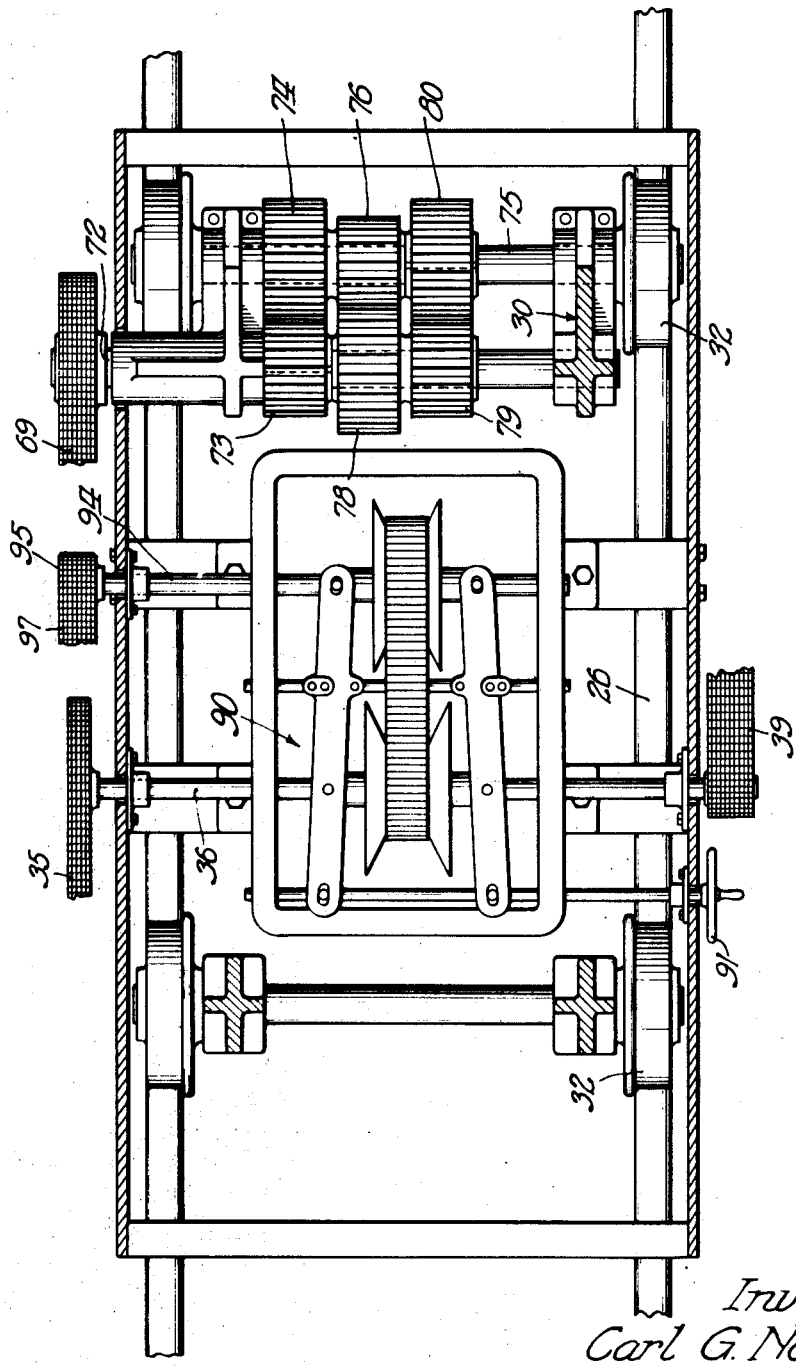

1,875,483

UNITED STATES PATENT OFFICE

CARL G. NAYLOR, OF CHICAGO, ILLINOIS, ASSIGNOR TO NAYLOR PIPE COMPANY, OF CHICAGO, ILLINOIS, A CORPORATION OF ILLINOIS

APPARATUS FOR FORMING PIPES AND THE LIKE

Application filed August 31, 1929. Serial No. 389,712.

My invention relates broadly to apparatus for forming pipe, and more particularly to apparatus for welding end-pieces to a previously formed pipe section.

The invention has, among its other objects, the production of apparatus of the kind described which is efficient, durable and easily controlled.

A particular object of the invention is to provide improved apparatus for handling a pipe.

Another particular object of the invention is to provide improved apparatus for welding tubular members to each other.

Still another particular object of the invention is to provide improved apparatus for welding tubular end-pieces, flanges, or the like, to the ends of a previously formed pipe, or the equivalent.

A preferred form of the invention is embodied in apparatus for welding tubular end-pieces of standard pipe dimensions to spiral pipe which has standard internal diameter, but does not have a wall of corresponding thickness. The apparatus comprises improved means for supporting and rotating the pipe and the standard end-pieces while the end-pieces are being welded to the pipe.

Many other objects and advantages will become apparent as this description progresses, reference being had to the accompanying drawings, wherein Figure 1 is a side elevation of the apparatus which embodies the invention;

Fig. 2 is an enlarged side elevation, partly in section, of a part of the apparatus shown in Fig. 1;

Fig. 3 is a plan elevation of the apparatus shown in Fig. 2;

Fig. 4 is a section taken on line 4—4 of Fig. 2;

Fig. 5 is a section taken on line 5—5 of Fig. 2;

Fig. 6 is an enlarged section taken on line 6—6 of Fig. 4, a portion of the figure being broken away to permit it to be shown in a relatively large scale, and Fig. 7 is a central section through a portion of the apparatus shown at the right-hand end of Fig. 1.

In the drawings, I have illustrated one form of the invention embodied in apparatus for welding end-pieces to spiral pipe which has been previously formed by winding a strip or ribbon of metal into spirally related convolutions, the convolutions being joined to each other by any suitable means, such as a lock-seam, a welded lock-seam, or a welded lap seam. Spiral pipe of this character is generally manufactured to have a standard internal diameter, but the wall thereof is relatively thin, and when two or more spiral pipes are to be coupled to each other it is generally impossible to employ standard coupling devices. For this reason, it is preferable to weld tubular end-pieces to the spiral pipe, the end-pieces being formed with standard internal and external diameters so that standard pipe screw-threads may be provided thereon, or so that the end-pieces of one pipe may be connected to the end-pieces of another pipe by standard coupling devices.

Referring for the present to Fig. 1 I have shown a spiral pipe at 10 to which end-pieces 11 and 12 are to be welded. The pipe 10 is formed of a plurality of spirally related convolutions 13 joined to each other by a seam 15. In this instance, the pipe 10 is assumed to have a standard internal diameter, but the external diameter thereof is less than the corresponding standard external diameter for wrought iron pipe. The tubular end-pieces, 11 and 12 have internal and external diameters which are standard, and it is readily understood that standard pipe screw-threads may be cut thereon, or that a plurality of the pipe with their ends may be coupled to each other by standard coupling devices.

As shown, the spiral pipe 10 and the tubular end-pieces 11 and 12 are supported by and between two truck units which are identified by reference characters 20 and 21. As hereinafter described, the truck units 20 and 21 may be brought into a plurality of adjusted positions with respect to each other, and in this instance the truck unit 21 is preferably secured in a permanent position. Thus, it will be noted that the truck unit 21 is provided with bracket members 23 in which setscrews 24 are provided for rigidly securing or locking the truck unit 21 to rails 26 upon which the two truck units are mounted. Intermediate the truck units 20 and 21, I have shown ways 28 and 29 upon which the spiral pipe may be rolled into a position wherein it is in alinement with the truck units 20 and 21 so that the operators of the apparatus may readily load the pipe upon members adapted to rotate it, while the ends are being welded thereto.

The construction of the truck unit 20 is illustrated in detail in Figs. 2 to 6, inclusive. It preferably comprises a frame which is designated generally by reference character 30, the frame being provided with suitable wheels 32 adapted to travel upon the rails 26. Mounted in the frame 30 is an electric motor 34 which is operatively connected by a sprocket chain 35 to a shaft 36 rotatably journaled in the frame, the shaft 36 being the main drive-shaft of the apparatus. Fixed to the shaft 36 is a sprocket 38 operatively connected by a sprocket chain 39 to a sprocket 40 fixed to a shaft 41 rotatably journaled in the frame 30. (See Fig. 3.) A sprocket 43 journaled on the shaft 41 is connected by a sprocket chain 44 to a sprocket 45 rigidly secured to a shaft 46, also rotatably journaled in the frame 30. A pinion 47 rotatably journaled upon the shaft 41 meshes with a gear 48 secured to the shaft 46, suitable clutch mechanisms 50 and 51 being mounted upon the shaft 41 to control the above described means connecting the shaft 41 to the shaft 46. Thus, the clutch mechanism 50 comprises a member 53 constrained to rotate with the sprocket 43, the clutch member 53 being frictionally engageable by a clutch member 55 constrained to rotate with the shaft 41, and the clutch mechanism 51 comprises a member 56 constrained to rotate with the pinion 47 and frictionally engageable by a member 57 constrained to rotate with the shaft 41. A clutch collar 59 mounted upon the shaft 41 intermediate the clutch members 55 and 57 is operatively connected to these members and may be displaced to hold both of the members 55 and 57 simultaneously in position, wherein they do not effectively engage the clutch members 53 and 56, respectively, or to hold either one of the clutch members 55 and 57 in effective engagement with its associated clutch members 53 or 56 while the other is disengaged. Means for displacing the clutch collar 59 preferably comprises a lever 60 having bifurcated ends 61 engaging pins 62 projecting from the collar 59, the lever 60 being rigidly secured to a pin 64 pivoted in the frame 30. Secured to the pin 64 is a lever or handle 66 which projects from the truck and may be manipulated by the operator of the apparatus.

A sprocket 68 fixedly secured to the shaft 46 is connected by a sprocket chain 69 to a sprocket 70 fixed to a shaft 72 journaled in the frame 30 (see Fig. 5). A pinion 73 keyed to the shaft 72 meshes with a gear 74 rotatably journaled upon a shaft 75, the shaft 75 being journaled in the frame 30 and having two of the wheels 32 fixed thereto. Formed integral with the gear 74 is a pinion 76 free to rotate with respect to the shaft 75, the pinion 76 being arranged to mesh with a gear 78 rotatably journaled upon the shaft 72. A pinion 79 preferably formed integral with the gear 78 meshes with a gear 80 keyed to the shaft 75. Obviously, the gears and pinions 73, 74, 76, 78, 79 and 80 constitute speed reducing mechanism, the construction being such that the shaft 72 drives the shaft 75 through the speed reducing mechanism.

It will be readily understood that if the lever or handle 66 is displaced to bring the clutch members 57 into effective engagement with the clutch member 56, the pinion 47 will drive the gear 48 and the shaft 46, which shaft will drive the shaft 72 through the sprocket chain 69. The rotation of the shaft 72 is of course imparted to the shaft 75 to drive the wheels 32, and the truck will be advanced towards the truck unit 21.

If the lever or handle 66 is manipulated to bring the clutch member 55 into effective engagement with the clutch member 53, the shaft 46 will be driven through the sprocket chain 44 and the rotation of the shaft 46 will be imparted to the shaft 75 through the mechanism above described. However, in this instance, the wheels 32 will be rotated to displace the truck unit 20 to the left (Fig. 1).

The shaft 36 constitutes a part of speed changing mechanism which is identified generally by reference character 90 controlled by a hand-wheel 91 accessible to the operator (see Fig. 5). The details of the speed-changing mechanism 90 do not form a part of this invention as any other suitable speed-changing mechanism may be employed, if it is desired. By means of the speed-changing mechanism 90, various speeds will be imparted to a shaft 94 journaled in the frame 30 and provided with a sprocket 95 which drives a sprocket 96 through the medium of a sprocket chain 97, the sprocket 96 being fixed to a shaft 99 journaled in the frame 30. A pinion 100 fixed to the shaft 99 meshes with a gear 101 fixed to a shaft 102 and a worm 103 fixed to the shaft 102 meshes with a worm-gear 104 journaled upon a tubular shaft 106. Formed integral with the worm-gear 104 are clutch jaws 108 engageable with clutch jaws 109 provided upon a clutch member 110 splined to the tubular shaft 106. Riding in a groove 112 formed in the clutch member 110 is a clutch collar 114 having pins 115 engaged with the bifurcated end of a lever 116. The lever 116 is pivoted to the frame 30 by a pin 117 and is connected by a link 118 to a lever 119 pivoted to the frame 30 by a pin 120. The lever 119 is accessible to the operator and may be manipulated to bring the clutch-jaws 109 into and out of engagement with the clutch-jaws 108. Obviously, when the clutch-jaws 109 engage the clutch-jaws 108, the tubular shaft 106 will be rotated.

The tubular shaft 106 is rotatably journaled in bearings 125, 126, provided upon the frame 30. Referring to Fig. 6, it will be noted that a tube 128 is concentrically disposed within the tubular shaft 106 and is secured in place by a sleeve 129 and a hub 130, the hub being preferably formed integral with a disc 131. The construction is such that when the shaft 106 is rotated, the shaft 128, the sleeve 129 and the disc 130 will also rotate. Screw-threaded upon the periphery of the disc is an annular flange 133 preferably formed integral with a cylindrical head 134 which has its front end closed by an integral wall 135. The chamber within the head 134 is identified by reference character 136. The rear end of the chamber 136 is preferably closed by a disc 138 provided with a central aperture 139. One or more apertures 140 are located near the periphery of the disk 138.

The flange 133 forms an annular shoulder 141 upon the head 134 and seated against this shoulder is a ring 142. Abutting the ring 142 and snugly fitting the external cylindrical surface of the head 134 is a sleeve 143, and abutting the sleeve 143 and snugly fitting the external cylindrical surface of the head 134 is a sleeve 145 which is preferably formed from copper. It will be noted that the thickness of the wall of the sleeve 145 is less than that of the sleeve 143 so that an annular shoulder 147 is provided.

During the operation of the improved apparatus the annular shoulder 147 serves as a stop for positioning the tubular end 11 and the construction is preferably such that when the tubular end-piece 11 abuts the annular shoulder 147, the adjacent end of the spiral pipe 10 overlaps a portion of the copper sleeve 145.

Mounted on a post 148 preferably formed integral with the wall 135 is a collar 149 of a diameter substantially equal to the external diameter of the copper sleeve 145 and the internal diameter of the spiral pipe 10. A tapered portion 150 formed upon the collar 149 functions as a guide when the end 11 and the pipe 10 are being positioned upon the head 134. The collar 149 is rigidly secured to the head 134 by a nut 153 screw-threaded upon the post 148.

Projecting from the left-hand end (Fig. 6) of the tube 128 and rigidly secured thereto is a sleeve 155 which has its outer end closed by a nut 156 screw-threaded thereon. Carried by the nut 156 and by a bushing 158 mounted in the sleeve 155 is a tube 160 which projects through the aperture 139 and into the chamber 136. That end of the tube 160 which is secured in the nut 156 is closed by a plug 162. Intermediate the nut 156 and the bushing 158 the tube 160 is provided with one or more apertures 164 in its wall. The sleeve 155 is provided with an aperture 167 positioned to one side of the bushing 158 and with an aperture 168 disposed on the other side of the bushing 158. Rotatably journaled upon the sleeve 155 are collars 170 and 171 and screw-threaded into the collars 170 and 171 are pipes 173 and 174, respectively, whereby cooling fluid may be circulated through the head 134. Thus the cooling fluid is preferably supplied through the pipe 173 which enters through the apertures 167 and 164 to the tube 160 being arranged to discharge the cooling fluid into the chamber 136. The cooling fluid returns to the pipe 174 by way of the aperture 140, the bore of the tube 128, the bore of the sleeve 155 and the aperture 168 provided in the sleeve 155. Obviously, the pipes 173 and 174 may be connected to any supply of cooling fluid, and it is also obvious that they will hold the collars 170 and 171 stationary. For this reason, I provide a plurality of packings 180, 181 and 182 for preventing leaks.

Screw-threaded into the frame 30 is a tubular post 185 upon which a welding device is adjustably mounted. The welding device 186 is preferably of the metallic electrode type and is of well known construction. Briefly, it comprises means for automatically feeding a welding wire 188 to the arc and automatic means for maintaining an arc length and a constant arc voltage. The wire 188 is drawn from the spool 189 mounted at the upper end of the tubular post 185. The construction is such that when the tubular member 11 at the left-hand end of the pipe 10 (Fig. 1) has been properly positioned upon the hollow head 134, the head may be rotated and the welding device 186 may be set in operation to weld the tubular member 11 to the pipe 10, as indicated at 190 in Fig. 6.

Pivoted by a pin 193 to the frame 30 is a dog 197 which is provided with a jaw 198 engageable with the tubular member 11 when the dog is displaced in a counter-clockwise direction (Fig. 2) from the position where it is shown in Fig. 6. The means for displacing the dog 197 in a counter-clockwise direction preferably comprises a lever 200 formed integral with a pin 201 journaled in the frame 30, the lever 200 being pivoted intermediate its ends and having one end engageable with the dog 197. The purpose of this construction will presently appear.

The truck unit 21 comprises a frame 30a which is preferably substantially identical with the above described frame 30 with the exception that preferably no provision is made therein for journaling shafting of the kind provided in the frame 30 for rotating a hollow head 134a and displacing the truck unit 21 relative to the truck unit 20 (see Figs. 1 and 7). However, the frame 30a preferably comprises bearings 125a and 126a which journal a tubular shaft 106a which is identical in construction with the above described tubular shaft 106, and carries like parts, including sleeves 143a and 145a which are identical to the above described sleeves 143 and 145, the sleeves 143a and 145a forming an annular shoulder 147a which serves as a stop for the tubular member 12. It will be noted that the tubular shaft 106a is provided with a hollow head 134a identical to the above described head 134 and that the hollow head 134a carries a tapered member 150a having the same function as the member 150. Also means identical with the means shown in Fig. 6 is provided for circulating a cooling fluid through the hollow head 134a.

Screw-threaded into the frame 30a is a tubular post 185a which carries a welding device 186a preferably identical in construction with the welding device 186 and supplied with a welding wire or electrode 188a from a spool 189a carried by the post 185a. It will be noted that the frame 30a is provided with a dog 197a and a lever 200a which are identical to the dog 197 and the lever 200, respectively and have the same functions, the dog 197a being provided with a jaw 198a.

The operation of the above described apparatus is substantially as follows: Assuming that the pipe 10 and the tubular members 11 and 12 are not positioned between the truck units 20 and 21 and that the truck unit 20 has been displaced in a direction away from the truck unit 21, it is readily understood that the sleeve 11 may be slipped in place upon the hollow head 134 and that the sleeve 12 may be set in place upon the hollow head 134a. The pipe 10 may then be rolled along the ways 28 and 29 into a position wherein its longitudinal axis is disposed substantially in the same vertical plane as the co-incident axes of the tubular shafts 106 and 106a. The operator may then manipulate the lever 66 to advance the truck unit 20 toward the truck unit 21 whereupon the tapered end 150 of the collar 149 will enter the left hand end (Fig. 1) of the pipe 10 and the tapered end 150a of the collar 149a will enter the right hand end of the pipe 10. It is readily understood that if the operator continues to advance the truck unit 20 towards the truck unit 21 the tapered ends projecting into the pipe 10 will lift the pipe and bring it into a position wherein it is concentrically disposed with respect to the heads 134 and 134a and continued displacement of the truck unit 20 will cause the ends of the pipe 10 to abut the edges of the tubular members 11 and 12. The lever 66 is then brought into its neutral position and the lever 119 is manipulated so that it causes the clutch jaws 109 to engage the jaws 108 whereupon the tubular shaft 106 is rotated, and this rotation is transmitted through the pipe and through the tubular shaft 106a. As soon as the pipe 10 and the tubular members 11 and 12 have commenced to rotate, the operator causes the welding devices 186 and 186a to function and weld the tubular members 11 and 12 to the ends of the pipe 10 while the pipe 10 and the tubular members are rotated through 360°. The operator then causes the welding devices to become functionally inoperative and the tubular members 11 and 12, together with the pipe 10 are no longer rotated. The lever 66 is then manipulated to withdraw the truck unit 20 sufficiently so that the hollow heads 134 and 134a and the collars 149 and 149a will be withdrawn from the pipe and from the tubular members 11 and 12, whereupon the pipe drops down upon the ways 28 and 29 and may be rolled away to make place for the following pipe.

In the event the pipe 10 or the tubular members 11 and 12 adhere to the hollow heads 134 and 134a, or to the collars 149 and 149a, the lever 200a associated with the frame 30a may be manipulated to bring the jaws 198a into engagement with the inner side edge of the tubular member 12, whereupon the tubular member 12, together with the pipe 10 and the tubular member 11 will be held in a fixed position with respect to the truck unit 21, then if the lever 66 is properly manipulated the truck unit 20 will back away from the truck unit 21 and forcibly withdraw the head 134 and the collar 150 from the tubular member 11. Then to dithdraw the tubular member 12 from the head 134a, the same method may be employed by bringing the jaw 198 into engagement with the inner side edge of the tubular member 11 after the head 134 has been re-inserted in it, then if the truck unit 20 is backed away, the tubular member 12 will be pulled off of the head 134a after which the jaws 198 may be disengaged from the tubular member 11 and the truck unit 20 may be backed away a further distance so that the pipe 10 will drop upon the ways.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intension to claim all novelty inherent in my invention as broadly as possible, in view of the prior art.

What I regard as new, and desire to secure by Letters Patent, is:

1. Apparatus for handling pipe while work is being done thereon, said apparatus comprising a pair of spaced mechanisms, one of said mechanisms being movable toward and away from the other, each of said mechanisms comprising a rotatable member adapted to hold one end of the pipe, and means including clutch means carried by said movable mechanism for displacing it away from and toward the other.

2. Apparatus for welding tubular members to the end of a pipe, said apparatus comprising a plurality of rotatable members for supporting and rotating the pipe, said rotatable members being provided with tapered ends which project through the tubular members and into the pipe, and means for displacing said tapered ends relative to each other to aline said pipe with said rotatable members.

3. Apparatus for handling pipe comprising a frame, a track along which said frame travels, a rotatable member journaled in said frame for supporting one end of the pipe, means carried by said frame for rotating said rotatable member and for advancing said frame along said track, and means for supporting the other end of the pipe.

4. Apparatus for welding a tubular member to the end of a pipe, said apparatus comprising a frame, a track along which said frame travels, a rotatable member journaled on said frame for supporting said tubular member and one end of the pipe, means carried by said frame for rotating said rotatable member and for advancing said frame along said track, means mounted on said frame for welding said tubular member to said pipe, and means for supporting the other end of the pipe.

5. Apparatus for welding a tubular member to the end of a pipe, said apparatus comprising a frame, a track along which said frame travels, means carried by the frame for supporting said tubular member and for supporting one end of the pipe, means carried by said frame for advancing it along said track, means mounted on said frame for welding said tubular member to said pipe, and means for supporting the other end of the pipe.

6. Apparatus for welding a tubular member to the end of a pipe, said apparatus comprising a track, a frame equipped with wheels traveling on said track, a member mounted in said frame for supporting said tubular member and one end of said pipe, means carried by the frame for driving said wheels to advance the frame along the track, welding means carried by said frame, and means for supporting the other end of the pipe.

7. Apparatus for welding a tubular member to the end of a pipe, said apparatus comprising a track, a frame equipped with wheels traveling on said track, a rotatable member journaled in said frame for supporting said tubular member and one end of the pipe, means carried by said frame for rotating said rotatable member and for driving said wheels to advance said frame along said track, means mounted on said frame for welding said tubular member to said pipe, and means for supporting the other end of the pipe.

8. Apparatus for welding a tubular member to the end of a pipe, said apparatus comprising a frame, a second frame spaced from the first mentioned frame, a rotatable member journaled in the first-mentioned frame, a second rotatable member journaled in said second frame, said rotatable members being provided to support the ends of a pipe and one of them being provided to carry said tubular member, means associated with the last mentioned rotatable member and engageable with said tubular member for preventing displacement of said tubular member longitudinally of said last mentioned rotatable member, welding means carried by one of said frames, and means for displacing one of said frames away from and toward the other.

9. Apparatus for welding a tubular member to the end of a pipe, said apparatus comprising a track, a frame equipped with wheels traveling on said track, a member rotatably journaled in said frame for supporting one end of the pipe, a second frame held against movement relative to said track, a second rotatably journaled member mounted in said second frame for supporting the other end of the pipe, welding apparatus carried by one of said frames, and means carried by the first frame for advancing it along said track.

In testimony whereof, I have hereunto set my hand, this 12th day of June, 1929.

CARL G. NAYLOR.